US011553121B2

(12) United States Patent
Jung

(10) Patent No.: US 11,553,121 B2
(45) Date of Patent: Jan. 10, 2023

(54) OPTICAL DEVICE, CAMERA MODULE INCLUDING THE OPTICAL DEVICE, AND APPARATUS INCLUDING THE CAMERA MODULE

(71) Applicant: Samsung Electronics Co., Ltd., Suwon-si (KR)

(72) Inventor: Younggyu Jung, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 321 days.

(21) Appl. No.: 16/868,910

(22) Filed: May 7, 2020

(65) Prior Publication Data

US 2021/0092263 A1 Mar. 25, 2021

(30) Foreign Application Priority Data

Sep. 23, 2019 (KR) ........................ 10-2019-0116906

(51) Int. Cl.
*H04N 5/225* (2006.01)
*G02B 13/00* (2006.01)
*G02B 5/18* (2006.01)
*G02B 27/00* (2006.01)

(52) U.S. Cl.
CPC ......... *H04N 5/2254* (2013.01); *G02B 5/1814* (2013.01); *G02B 5/1876* (2013.01); *G02B 13/002* (2013.01); *G02B 27/0037* (2013.01); *H04N 5/2253* (2013.01); *H04N 5/2257* (2013.01)

(58) Field of Classification Search
CPC .............. G02B 13/002; G02B 13/0045; G02B 13/0065; G02B 13/007; G02B 27/0037; G02B 27/4205; G02B 5/1814; G02B 5/1876; H04N 5/2254; H04N 5/2257; H04N 5/2258
See application file for complete search history.

(56) References Cited

U.S. PATENT DOCUMENTS

| 5,652,681 | A | * | 7/1997 | Chen .................... G02B 5/1814 359/566 |
| 5,699,186 | A | | 12/1997 | Richard |
| 6,046,867 | A | | 4/2000 | Rana |
| 6,396,639 | B1 | | 5/2002 | Togino et al. |
| 6,961,162 | B2 | | 11/2005 | Nakamura et al. |
| 8,203,789 | B1 | * | 6/2012 | Martinelli ................. G01J 3/18 359/566 |
| 9,562,997 | B2 | * | 2/2017 | Suzuki ..................... G02B 5/18 |
| 9,946,089 | B2 | | 4/2018 | Chen et al. |
| 10,802,291 | B1 | * | 10/2020 | Pergola ................ G02B 27/283 |

(Continued)

FOREIGN PATENT DOCUMENTS

JP 4372891 B2 11/2009

*Primary Examiner* — Amy R Hsu
(74) *Attorney, Agent, or Firm* — Harness, Dickey & Pierce, P.L.C.

(57) ABSTRACT

An optical device includes a refractive prism including a first surface facing an object, a second surface facing a first lens, and a third surface configured to reflect incident light to change a path of the incident light, one of the first surface, the second surface, or both the first and the second surface includes a pattern such that the refractive prism is a diffractive optical element; and a plurality of lenses including the first lens.

20 Claims, 19 Drawing Sheets

(56) References Cited

U.S. PATENT DOCUMENTS

| | | | |
|---|---|---|---|
| 2004/0070853 A1* | 4/2004 | Ebizuka | G01J 3/18 |
| | | | 359/833 |
| 2009/0128873 A1* | 5/2009 | Lopes | G02B 5/32 |
| | | | 359/558 |
| 2014/0153114 A1 | 6/2014 | Suzuki | |
| 2017/0351110 A1* | 12/2017 | Gurgov | G02B 27/095 |
| 2017/0357038 A1* | 12/2017 | Ludovici | G02B 27/4244 |
| 2019/0079275 A1 | 3/2019 | Lai et al. | |
| 2019/0317256 A1* | 10/2019 | Gulati | G02B 3/0018 |
| 2020/0011638 A1* | 1/2020 | Mills | G02B 27/4205 |
| 2020/0159122 A1* | 5/2020 | Tonchev | G02B 5/1838 |

\* cited by examiner

OPTICAL DEVICE, CAMERA MODULE INCLUDING THE OPTICAL DEVICE, AND APPARATUS INCLUDING THE CAMERA MODULE

CROSS-REFERENCE TO RELATED APPLICATION(S)

This application claims benefit of priority to Korean Patent Application No. 10-2019-0116906 filed on Sep. 23, 2019 in the Korean Intellectual Property Office, the disclosure of which is incorporated herein by reference in its entirety.

BACKGROUND

The present inventive concept relates to an optical device, a camera module including the optical device, and/or an apparatus including the camera module.

Recently, high-performance camera modules may be mounted on various apparatuses such as smartphones, and the like. In addition, such apparatuses may have a relatively thin thickness. Therefore, there may be a desire for a technology that allows a high-performance camera module to be mounted in an apparatus having a relatively thin thickness.

SUMMARY

Some aspects of the present inventive concepts provide optical devices for mounting a high-performance cameras module in apparatuses having relatively thin thicknesses.

Some aspects of the present inventive concepts provide camera modules including optical devices for achieving the above objects.

Some aspects of the present inventive concepts provide apparatuses including the camera modules.

In one embodiment, an optical device includes a refractive prism including a first surface facing an object, a second surface facing a first lens, and a third surface configured to reflect incident light to change a path of the incident light, one of the first surface, the second surface, or both the first and the second surface includes a pattern such that the refractive prism is a diffractive optical element; and a plurality of lenses, including the first lens.

In one embodiment, a camera module includes an optical device including a refractive prism including a first surface facing an object, a second surface facing a first lens, and a third surface configured to reflect incident light to change a path of the incident light, at least one of the first surface and the second surface includes a pattern such that the refractive prism is a diffractive optical element; and a plurality of lenses, including the first lens; and an image sensor configured to convert light incident from the optical device into an electrical signal, and output the electrical signal.

In one embodiment, an apparatus includes at least one camera module, wherein the at least one camera module includes an optical device including a refractive prism including a first surface on an object side, a second surface on a lens side, and a third surface configured to reflect incident light to change a path of the incident light, one of the first surface, the second surface, or both the first and the second surface includes a pattern such that the refractive prism is a diffractive optical element; and a plurality of lenses; and an image sensor configured to convert light incident from the optical device into an electrical signal, and output the electrical signal.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Hereinafter, example embodiments of the present inventive concepts will be described with reference to the accompanying drawings. However, example embodiments of the present inventive concepts may be modified in various other forms, and the scope of the present inventive concepts are not limited to the example embodiments described below. In addition, example embodiments of the present inventive concepts may be provided to more completely explain the present inventive concepts to those skilled in the art.

Figure 1:
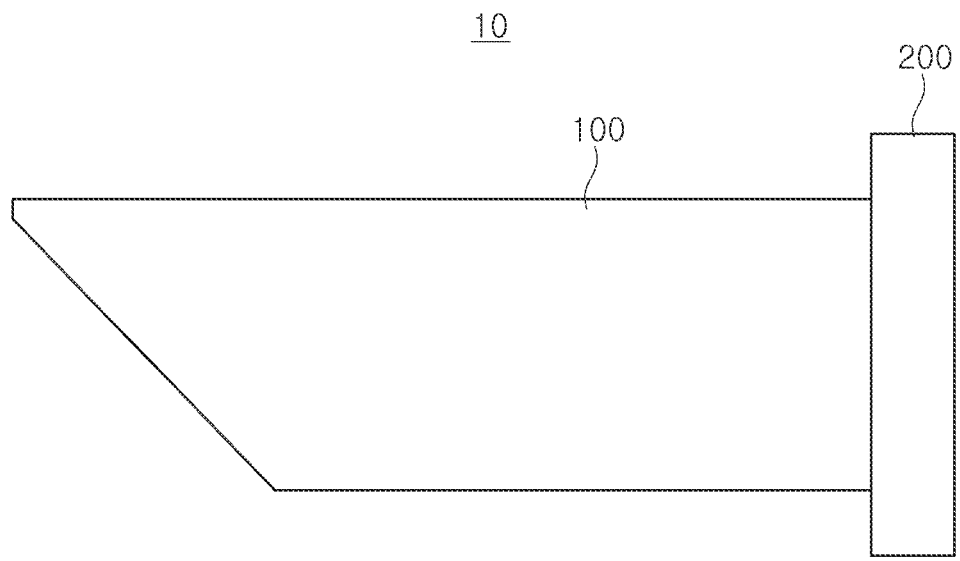
FIG. 1 is a view schematically illustrating a camera module according to some example embodiments of the present inventive concepts.

FIG. 1 is a view schematically illustrating a camera module according to some example embodiments of the present inventive concepts. In this case, a camera module 10 according to some example embodiments of the present inventive concepts may include an optical device 100 and an image sensor 200.

The optical device 100 may include a plurality of lenses. The optical device 100 according to some example embodiments of the present inventive concepts may be a curved optical device including at least one refractive prism.

The image sensor 200 may convert light incident from an external subject through the optical device into an electrical signal, and may output the electrical signal.

In some of the example embodiments illustrated in FIG. 1, the light from the external subject may be refracted by the refraction prism included in the optical device 100, and may be incident on the image sensor 200. Therefore, an incident surface on which the light is incident from the image sensor 200 may be disposed in parallel with the surface from which the light exits from the refraction prism. For example, the image sensor 200 may be mounted vertically on a substrate for inputting and outputting an electrical signal.

Meanwhile, in some of the example embodiments illustrated in FIG. 1, a ratio of an effective focal length (EFL) to a full length (TTL) in the optical device 100 may be greater than 1.0.

Figure 2:
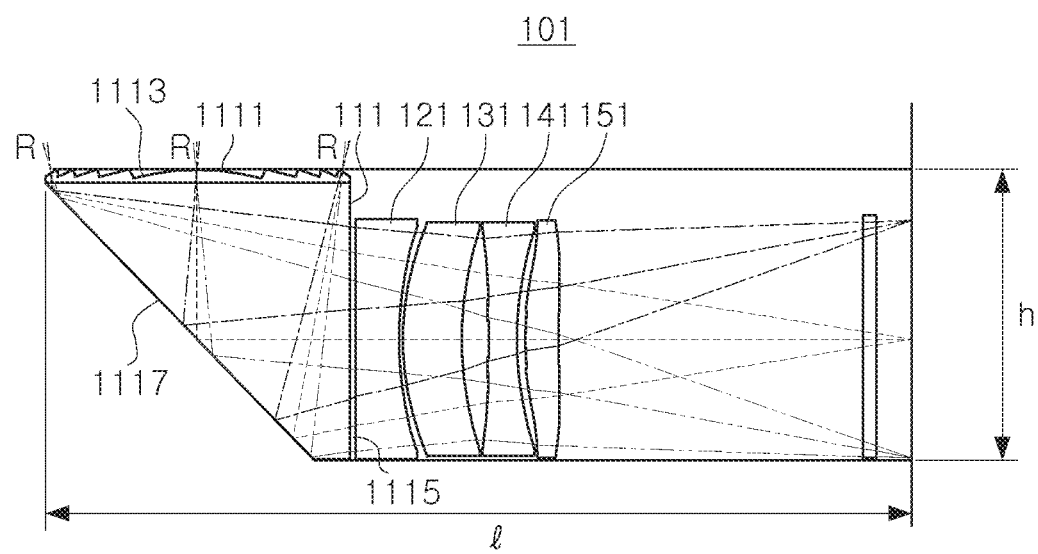
FIGS. 2 to 4 are views schematically illustrating an optical device according to some example embodiments of the present inventive concepts.
Figure 3:
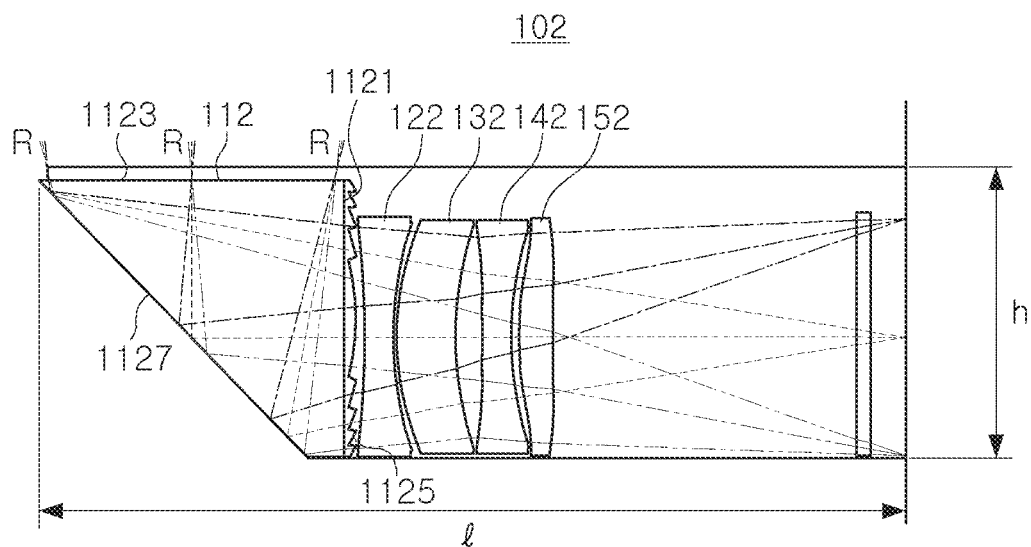
Figure 4:
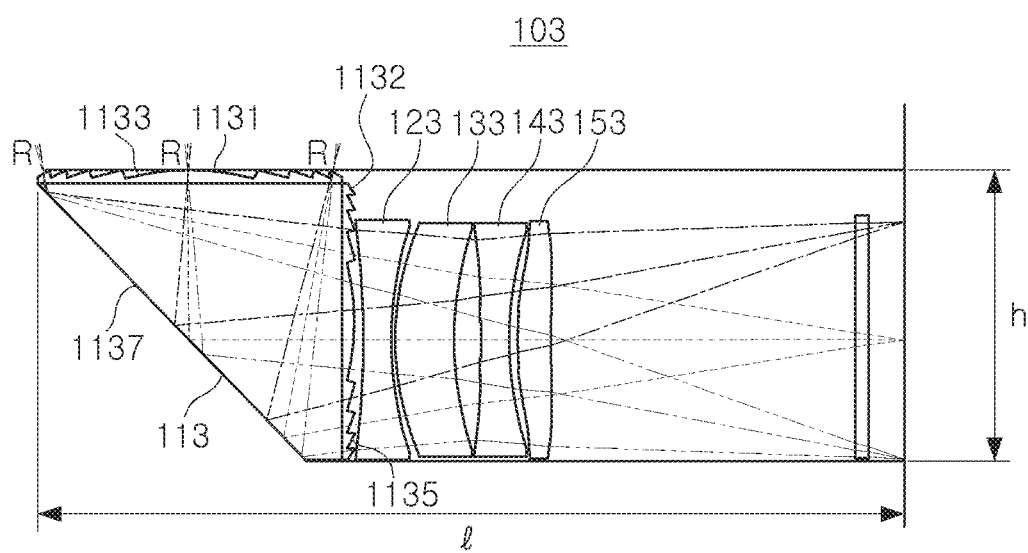

FIGS. 2 to 4 are views schematically illustrating an optical device according to some example embodiments of the present inventive concepts.

An optical device 101 according to some example embodiments of the present inventive concepts, illustrated in FIG. 2, may include a refractive prism 111 and a plurality of lenses 121, 131, 141, and 151.

The refractive prism 111 may change a direction of incident light. The refractive prism 111 may include a first surface 1113 toward, or facing, an object, a second surface 1115 toward, or facing, a lens, and a third surface 1117 on which light incident on the first surface 1113 is reflected in a 90-degree direction. Rays R show light incident on the first surface 1113 being reflected perpendicularly by the third surface 1117.

As illustrated in FIG. 2, a pattern 1111 may be formed on the first surface 1113 of the refractive prism 111 toward the object such that the refractive prism 111 functions as a diffraction optical element (DOE). The second surface 1115 may be parallel to an incident surface of an image sensor. For example, the second surface 1115 may be perpendicular to an upper surface of a substrate on which the optical device 101 is mounted.

Each of the lenses 121, 131, 141, and 151 may have a predetermined, or, alternatively, desired, refractive power. In some of the example embodiments illustrated in FIG. 2, an aperture size of the first surface 1113, on which the pattern 1111 is formed to allow the refractive prism 111 to function as a diffractive optical element, may be greater than an average value of aperture sizes of the plurality of lenses 121, 131, 141, and 151. For example, a ratio of the aperture size of the first surface 1113 of the refractive prism 111 to an average aperture size of the plurality of lenses 121, 131, 141, and 151 may be greater than 1.0.

An optical device 102 according to some example embodiments of the present inventive concepts, illustrated in FIG. 3, may include a refractive prism 112 and a plurality of lenses 122, 132, 142, and 152.

The refractive prism 112 may change a direction of incident light. The refractive prism 112 may include a first surface 1123 toward an object, a second surface 1125 toward a lens, and a third surface 1127 on which light incident on the first surface 1123 is reflected in a 90-degree direction. As illustrated in FIG. 3, a pattern 1121 may be formed on the first surface 1123 of the refractive prism 112 toward the object such that the refractive prism 112 functions as a diffraction optical element (DOE).

Each of the lenses 122, 132, 142, and 152 may have a predetermined, or, alternatively, desired, refractive power. In some of the example embodiments illustrated in FIG. 3, a ratio of an aperture size of the second surface 1125 on which the pattern 1121 is formed to an average aperture size of the plurality of lenses 122, 132, 142, and 152 may be greater than 1.0.

An optical device 103 according to some example embodiments of the present inventive concepts, illustrated in FIG. 4, may include a refractive prism 113 and a plurality of lenses 123, 133, 143, and 153.

The refractive prism 113 may change a direction of incident light. The refractive prism 113 may include a first surface 1133 toward an object, a second surface 1135 toward a lens, and a third surface 1137 on which light incident on the first surface 1133 is reflected in a 90-degree direction. As illustrated in FIG. 4, patterns 1131 and 1132 may be arranged on the first surface 1133 toward the object and the second surface 1135 toward the lens in the refractive prism 113, respectively, such that the refractive prism 113 functions as a diffraction optical element (DOE). The patterns 1131 and 1132 may have the same aperture size, or different aperture sizes.

Each of the lenses 123, 133, 143, and 153 may have a predetermined, or, alternatively, desired, refractive power. In some of the example embodiments illustrated in FIG. 4, a ratio of an average aperture size of the first and second surfaces 1133 and 1135 on which the patterns 1131 and 1132 are formed and an average aperture size of the plurality of lenses 123, 133, 143, and 153 may be greater than 1.0. The patterns 1131 and 1132 may have the same aperture size, or different aperture sizes.

Although FIGS. 2 to 4 illustrate the case in which the optical device includes four lenses, the number of lenses may be appropriately adjusted. In addition, an optical device according to some example embodiments of the present inventive concepts is not limited to the shapes of the lenses illustrated in FIGS. 2 to 4. In addition, although not illustrated in FIGS. 2 to 4, an optical device according to some example embodiments of the present inventive concepts may further include an aperture for adjusting an amount of light. In addition, an optical device may further include filters for various purposes. In addition, portions of the plurality of lenses may be configured to be movable along an optical axis.

FIGS. 2 to 4, a length ($\ell$) of the optical device may be about 5 mm or more and about 20 mm or less, and a height (h) of the optical device may be about 10 mm or less. For example, in consideration of a form factor of an apparatus on which the optical device is mounted, the length ($\ell$) of the optical device may be determined to be about 10 mm or more and about 15 mm or less, and the height (h) of the optical device may be determined to be about 5 mm or less.

When the terms "about" or "substantially" are used in this specification in connection with a numerical value, it is intended that the associated numerical value includes a manufacturing or operational tolerance (e.g., ±10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

For example, an optical device according to some example embodiments of the present inventive concepts may have a pattern formed on at least one of a first surface toward an object and a second surface toward a lens in a refractive prism such that the refractive prism functions as a diffractive optical element. Therefore, the refractive prism may not only serve to convert a path of light, may but also function as a lens. For this reason, the number of lenses arranged at a rear end of the refractive prism may be reduced. Further, since the refractive prism performs a function of an objective lens, for example, the first lens toward the object, and as a result, a height, or distance light traveling from external to the optical device to the optical sensor must travel, of the optical device may be further reduced.

Figure 5:
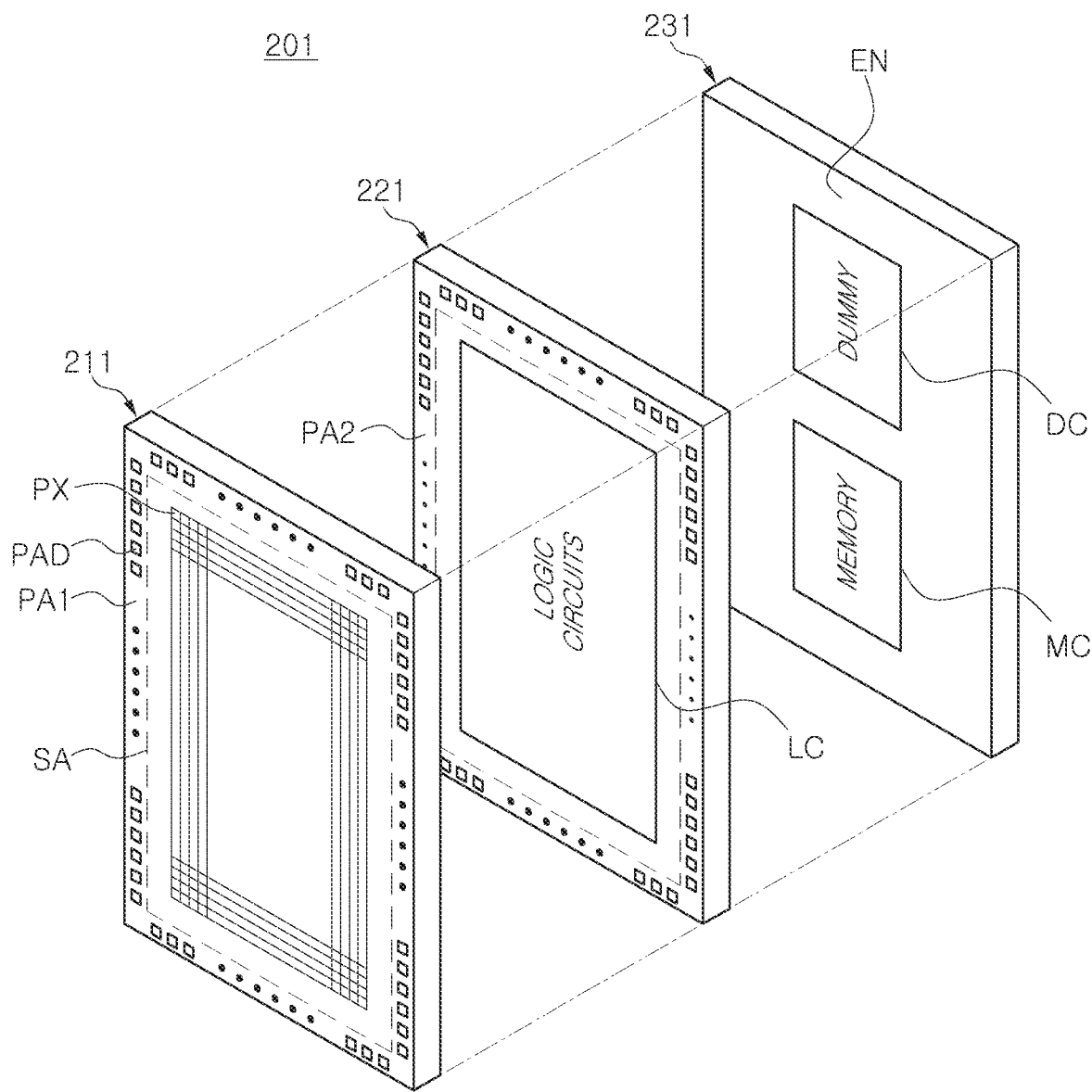
FIGS. 5 and 6 are views schematically illustrating an image sensor of a camera module according to some example embodiments of the present inventive concepts.
Figure 6:
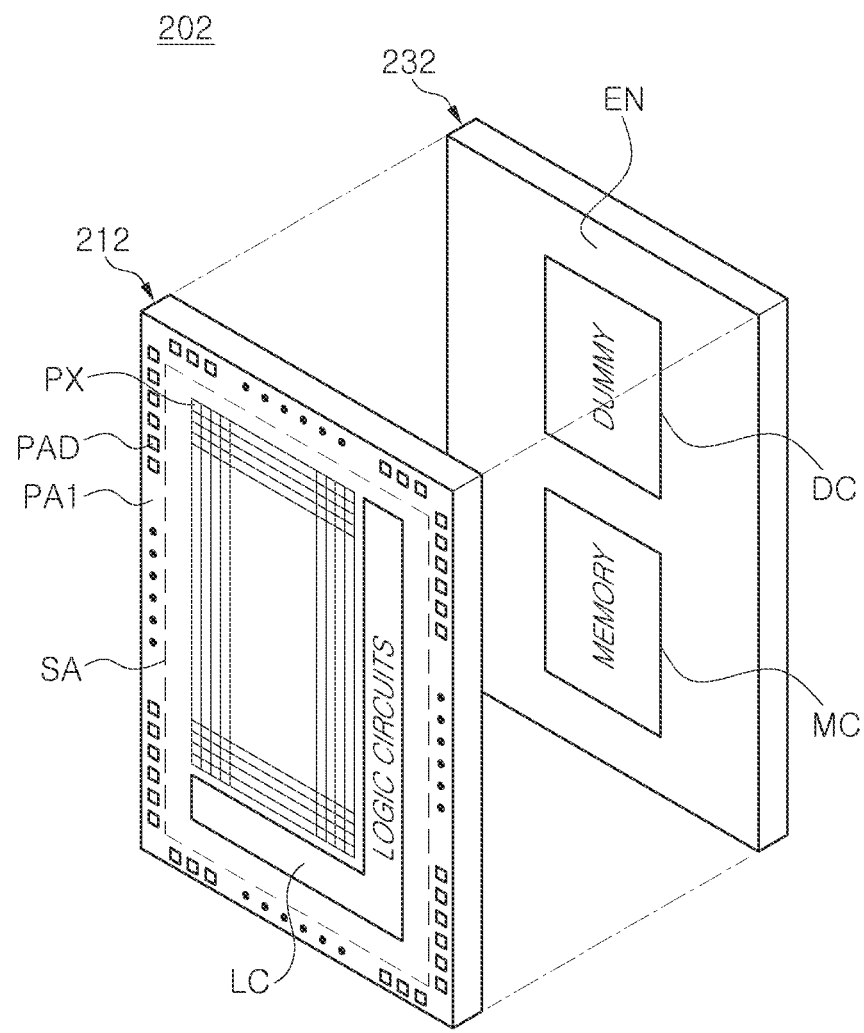

FIGS. 5 and 6 are views schematically illustrating an image sensor of a camera module according to some example embodiments of the present inventive concepts.

Referring to FIG. 5, an image sensor 201 according to some example embodiments of the present inventive concepts may include a first layer 211, a second layer 221, a third layer 231, and the like. The first layer 211, the second layer 221, and the third layer 231 may be stacked on each other. In some of the example embodiments, the first layer 211 and the second layer 221 may be stacked on each other on a wafer level, and the third layer 231 may be attached to the second layer 221 on a chip level. The first to third layers 211 to 231 may be provided in a single semiconductor package.

The first layer 211 may include a sensing area SA in which a plurality of pixels PX are provided, and a first pad area PA1 provided around the sensing area SA. The first pad area PA1 may include a plurality of upper pads PAD, and the plurality of upper pads PAD may be connected to pads provided in a second pad area PA2 of the second layer 221, and a control logic LC, through a via VIA, or the like.

Each of the plurality of pixels PX may include a photodiode for receiving light to generate charge, a pixel circuit for processing the charge generated by the photodiode, and the like. The pixel circuit may include a plurality of transistors for outputting a voltage corresponding to the charge generated by the photodiode.

The second layer 221 may include a plurality of elements that provide the control logic LC. The plurality of elements included in the control logic LC may provide circuits for driving the pixel circuit provided in the first layer 211, for example, a row driver, a column driver, a timing controller, and the like. The plurality of elements included in the control logic LC may be connected to the pixel circuit through the first and second pad areas PA1 and PA2. The control logic LC may obtain a reset voltage and a pixel voltage from the plurality of pixels PX to generate a pixel signal.

In some of the example embodiments, at least one of the plurality of pixels PX may include a plurality of photodiodes disposed on the same level. The pixel signals generated from the charges of each of the plurality of photodiodes may have a phase difference from each other, and the control logic LC may provide an autofocus function, based on the phase difference of the pixel signals generated from the plurality of photodiodes included in a pixel PX.

The third layer 231 attached to the second layer 221 may include a memory chip MC, a dummy chip DC, and a protective layer EN sealing the memory chip MC and the dummy chip DC. The memory chip MC may be a dynamic random access memory (DRAM) or a static random access memory (SRAM), and the dummy chip DC may not have a function. The memory chip MC may be electrically connected to at least a portion of elements included in the control logic LC of the second layer 221 by a bump, and may store data necessary, or alternatively, useful, to provide an autofocus function. In some example embodiments, the bump may be a micro bump.

Referring to FIG. 6, an image sensor 202 according to some example embodiments of the present inventive concepts may include a first layer 212 and a second layer 232. The first layer 212 may include a sensing area SA in which a plurality of pixels PX are provided, a control logic LC in which elements for driving the plurality of pixels PX are provided, and a first pad area PA1 disposed around the sensing area SA and the control logic LC. The first pad area PA1 may include a plurality of upper pads PAD, and the plurality of upper pads PAD may be connected to a memory chip MC provided in the second layer 232, through vias VIA, or the like. The second layer 232 may include the memory chip MC, a dummy chip DC, and a protective layer EN sealing the memory chip MC and the dummy chip DC.

Figure 7:
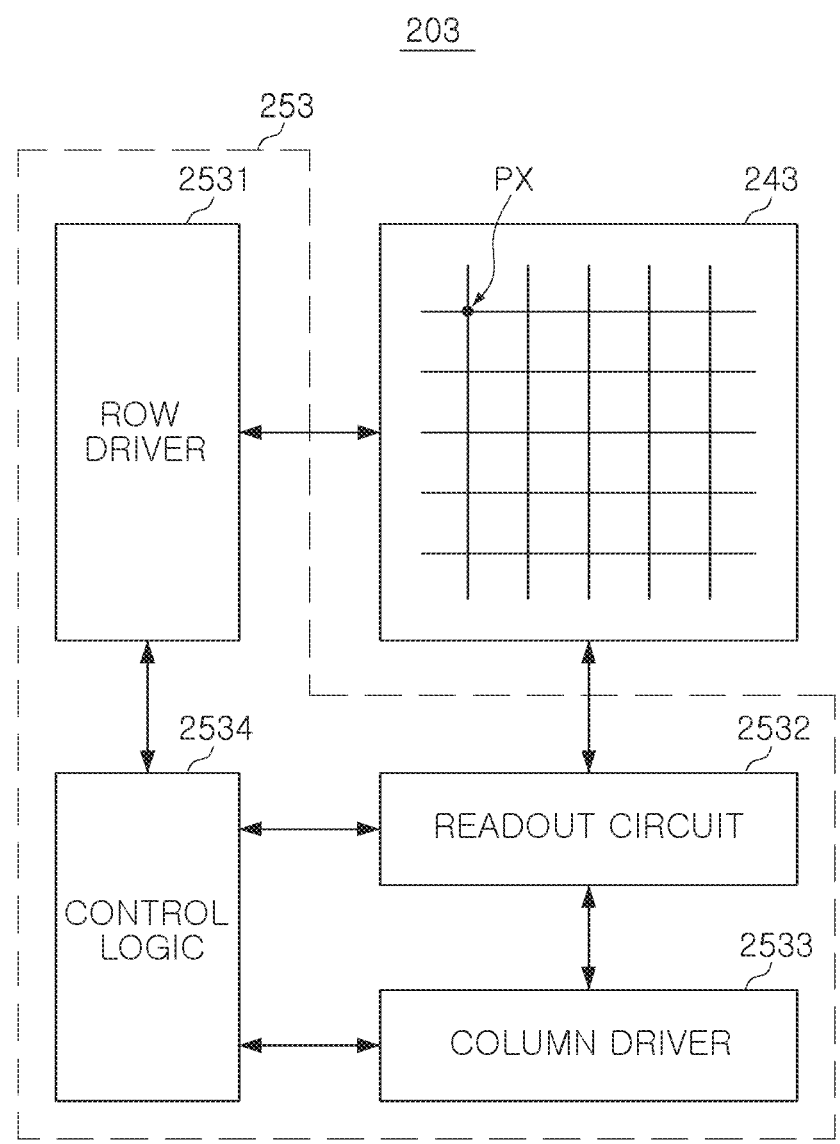
FIGS. 7 and 8 are block diagrams schematically illustrating an image sensor according to some example embodiments of the present inventive concepts.
Figure 8:
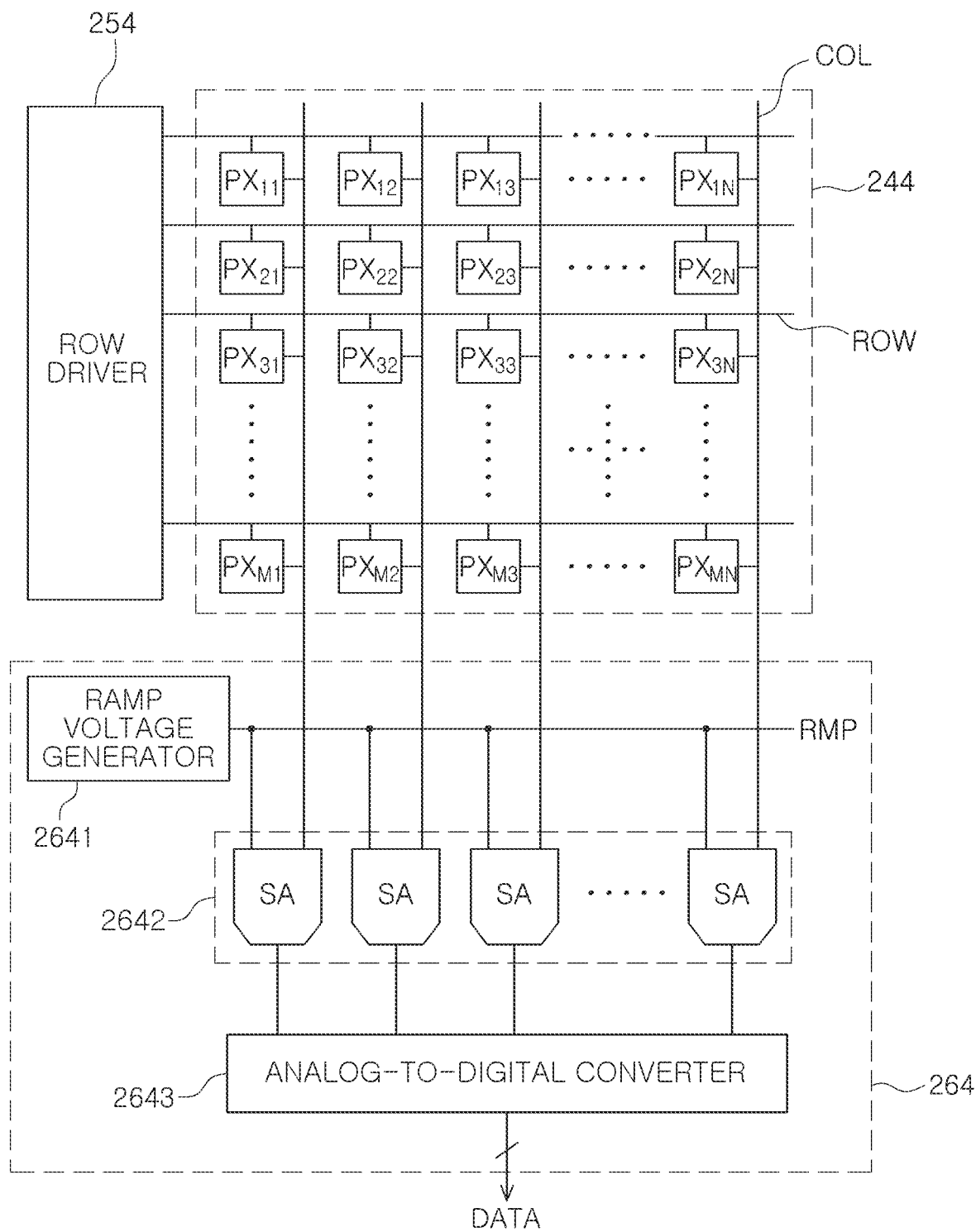

FIGS. 7 and 8 are block diagrams schematically illustrating an image sensor according to some example embodiments of the present inventive concepts.

Referring to FIG. 7, an image sensor 203 may include a pixel array 243, a controller 253, and the like.

The controller 253 (and other circuitry, e.g., the row drier 254, or subcircuitry, e.g., the control logic 2534, row driver 2531, readout circuit 2532, or column driver 2533) may include processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

The pixel array 243 may include a plurality of pixels PX arranged in an array along a plurality of rows and a plurality of columns. Each of the plurality of pixels PX may include a photodiode generating charge in response to an optical signal incident externally, a pixel circuit generating an electrical signal corresponding to the charge generated by the photodiode, and the like. In some of the example embodiments, the pixel circuit may include a floating diffusion, a storage transistor, a transfer transistor, a reset transistor, a driving transistor, a selection transistor, and the like. According to example embodiments, configurations of the pixels PX may vary. For example, each of the pixels PX may include an organic photodiode including an organic material, in a different manner to a silicon photodiode, or may be implemented as a digital pixel. When the pixels PX are implemented as digital pixels, each of the pixels PX may include a comparator, a counter for converting an output of the comparator into a digital signal and outputting the results, and the like.

The controller 253 may include a plurality of circuits for controlling the pixel array 243. For example, the controller 253 may include a row driver 2531, a readout circuit 2532, a column driver 2533, a control logic 2534, and the like. The row driver 2531 may drive the pixel array 243 in units of rows. For example, the row driver 2531 may generate a transfer control signal for controlling the transfer transistor of the pixel circuit, a reset control signal for controlling the reset transistor of the pixel circuit, a selection control signal for controlling the selection transistor of the pixel circuit, and the like.

The readout circuit 2532 may include a correlated double sampler (CDS), an analog-to-digital converter (ADC), or the like. The correlated double sampler may be connected to pixels PX included in a row selected by a row select signal supplied by the row driver 2531, through column lines, and may perform a correlated double sampling operation to detect a reset voltage and a pixel voltage. The analog-to-digital converter may convert the reset voltage and the pixel voltage, detected by the correlated double sampler, into a digital signal, and may transmit the converted digital signal to the column driver 2533.

The column driver 2533 may include a latch or buffer circuit capable of temporarily storing the digital signal, an amplifier circuit, and the like, and may process the digital signal received from the readout circuit 2532. The row driver 2531, the readout circuit 2532, and the column driver 2533 may be controlled by the control logic 2534. The control logic 2534 may include a timing controller for controlling the operation timing of the row driver 2531, the readout circuit 2532, and the column driver 2533, an image signal processor for processing image data, and the like.

The control logic 2534 may perform a signal processing on data output from the readout circuit 2532 and the column driver 2533 to generate image data. For example, the image data may include a depth map. In addition, the control logic 2534 may use the data output from the readout circuit 2532 and the column driver 2533 to generate image data.

Referring to FIG. 8, an image sensor 204 according to some example embodiments of the present inventive concepts may include a pixel array 244, and a controller for driving the pixel array 244. The controller may include a row driver 254, a readout circuit 264, and the like. The readout circuit 264 may include a ramp voltage generator 2641, a sampling circuit 2642, an analog-to-digital converter 2643, and the like. Data DATA output from the analog-to-digital converter 2643 may be input to a column driver.

The pixel array 244 may include a plurality of pixels $PX_{11}$ to $PX_{MN}$ provided at intersections of a plurality of row lines ROW and a plurality of column lines COL. The row driver 254 may input a signal necessary, or alternatively, useful, for controlling the plurality of pixels $PX_{11}$ to $PX_{MN}$ through the plurality of row lines ROW. For example, the signal input to the plurality of pixels $PX_{11}$ to $PX_{MN}$ through the plurality of row lines ROW may include a reset control signal RG, a transmission control signal TG, a selection control signal SEL, and the like. The row driver 254 may sequentially select each of the plurality of row lines ROW. The row driver 254 may select one of the plurality of row lines ROW for a predetermined, or, alternatively, desired, horizontal period.

The sampling circuit 2642 may obtain a reset voltage and a pixel voltage, from portions of pixels connected to row lines scanned by the row driver 254, among the plurality of pixels $PX_{11}$ to $PX_{MN}$. The sampling circuit 2642 may include a plurality of samplers SA, and the plurality of samplers SA may be correlated double samplers. Each of the samplers SA may receive a ramp voltage generated by the ramp voltage generator 2641 through a first input terminal, and may receive a reset voltage and a pixel voltage from the plurality of pixels $PX_{11}$ to $PX_{MN}$ through a second input terminal.

FIGS. 9A to 9E are views schematically illustrating an apparatus according to some example embodiments of the present inventive concepts, and illustrate cases in which a plurality of camera modules are arranged in a width direction of the apparatus.

Figure 9A:
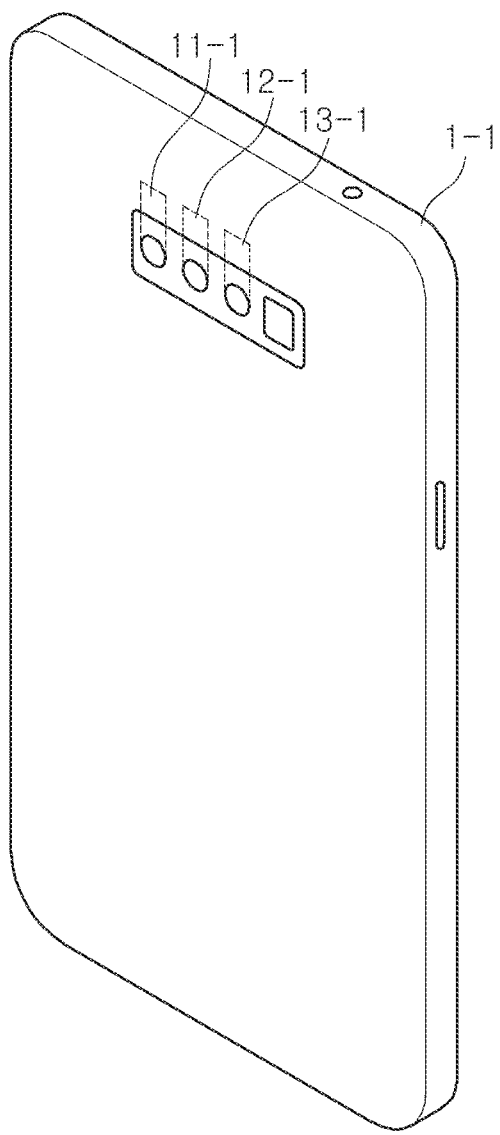
FIGS. 9A to 11B are views schematically illustrating an apparatus according to some example embodiments of the present inventive concepts.

Referring to FIG. 9A, an apparatus 1-1 may include a first camera module 11-1, a second camera module 12-1, and a third camera module 13-1, sequentially arranged in a width direction of the apparatus.

As illustrated in FIG. 9A, the first camera module 11-1, the second camera module 12-1, and the third camera module 13-1 may be arranged such that a length direction of the first to third camera modules 11-1, 12-1, and 13-1 is identical, or, alternatively, parallel to a length direction of the apparatus, but may be arranged in an upper portion of the apparatus in the length direction of the apparatus, relative to the camera lens constituting an exterior of the apparatus.

Figure 9B:
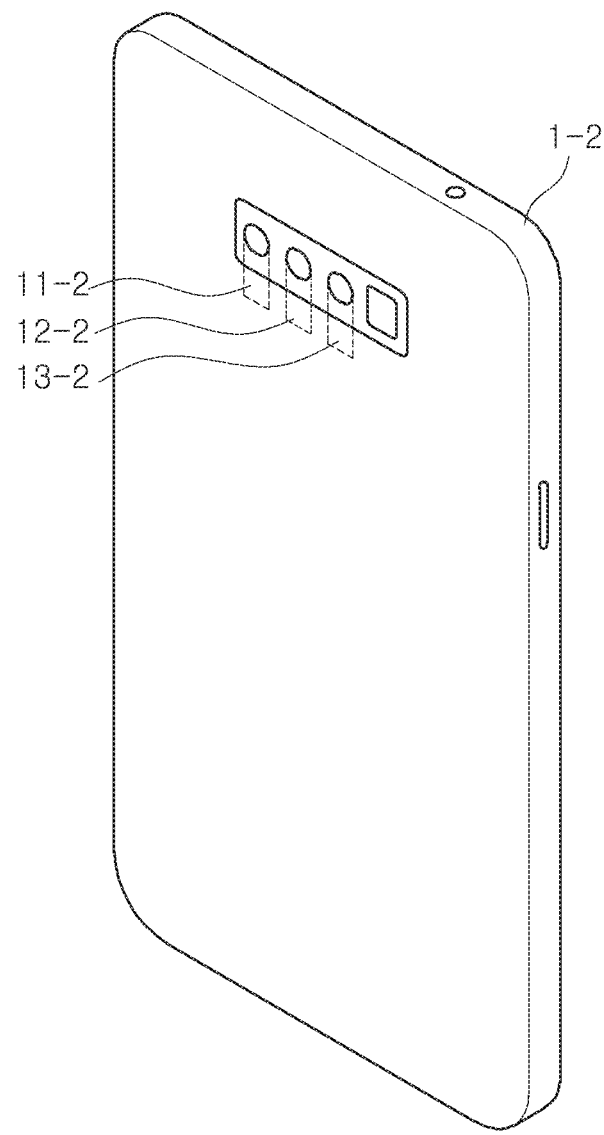

Referring to FIG. 9B, an apparatus 1-2 may include a first camera module 11-2, a second camera module 12-2, and a third camera module 13-2, sequentially arranged in the width direction of the apparatus.

As illustrated in FIG. 9B, the first camera module 11-2, the second camera module 12-2, and the third camera module 13-2 may be arranged such that a length direction of the first to third camera modules 11-2, 12-2, and 13-2 is identical to a length direction of the apparatus, but may be arranged in a lower portion of the apparatus in the length direction of the apparatus, relative to the camera lens constituting an exterior of the apparatus.

Figure 9C:
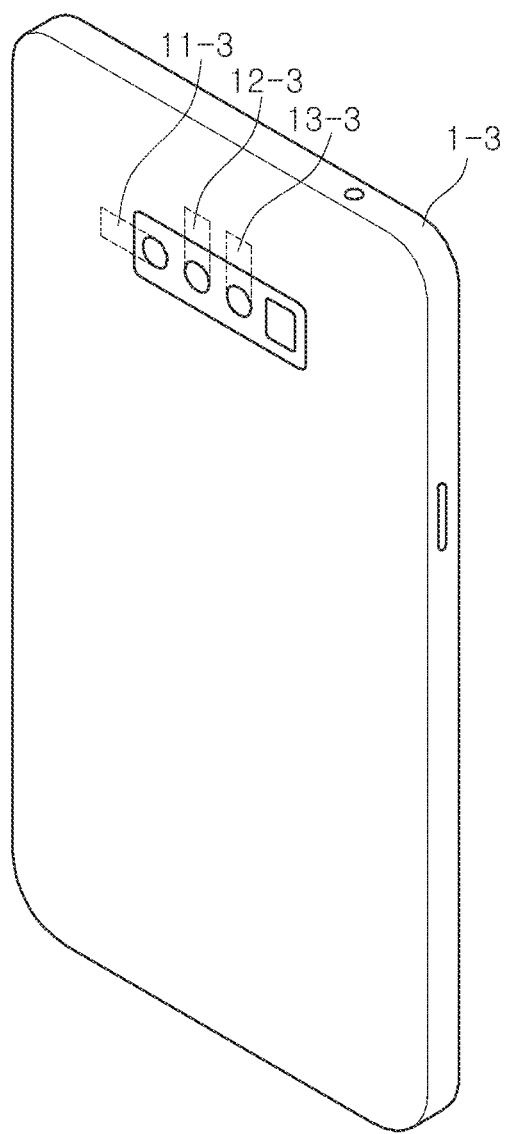

Referring to FIG. 9C, an apparatus 1-3 may include a first camera module 11-3, a second camera module 12-3, and a third camera module 13-3, sequentially arranged in the width direction of the apparatus.

As illustrated in FIG. 9C, the first camera module 11-3 may be disposed such that a length direction of the first camera module 11-3 is identical to a width direction of the apparatus. The second camera module 12-3 and the third camera module 13-3 may be arranged such that a length direction of the second and third camera modules 12-3 and 13-3 is identical to a length direction of the apparatus, but may be arranged in an upper portion of the apparatus in the length direction of the apparatus, relative to the camera lens constituting an exterior of the apparatus.

Figure 9D:
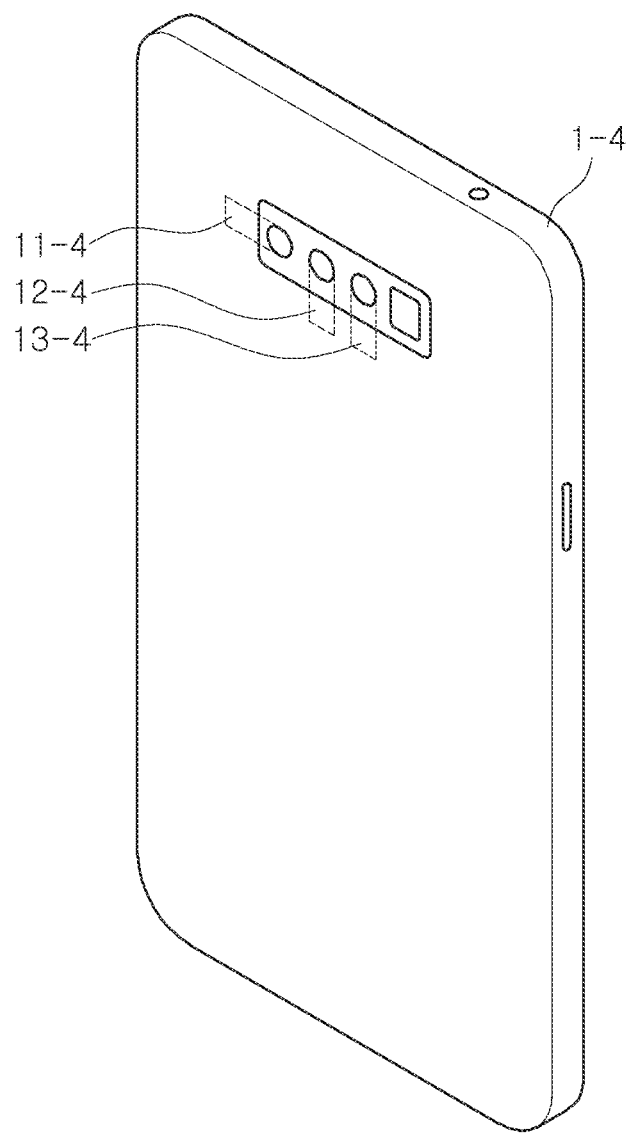

Referring to FIG. 9D, an apparatus 1-4 may include a first camera module 11-4, a second camera module 12-4, and a third camera module 13-4, sequentially arranged in the width direction of the apparatus.

As illustrated in FIG. 9D, the first camera module 11-4 may be disposed such that a length direction of the first camera module 11-4 is identical to a width direction of the apparatus. The second camera module 12-4 and the third camera module 13-4 may be arranged such that a length direction of the second and third camera modules 12-4 and 13-4 is identical to a length direction of the apparatus, but may be arranged in a lower portion of the apparatus in the length direction of the apparatus, relative to the camera lens constituting an exterior of the apparatus.

Figure 9E:
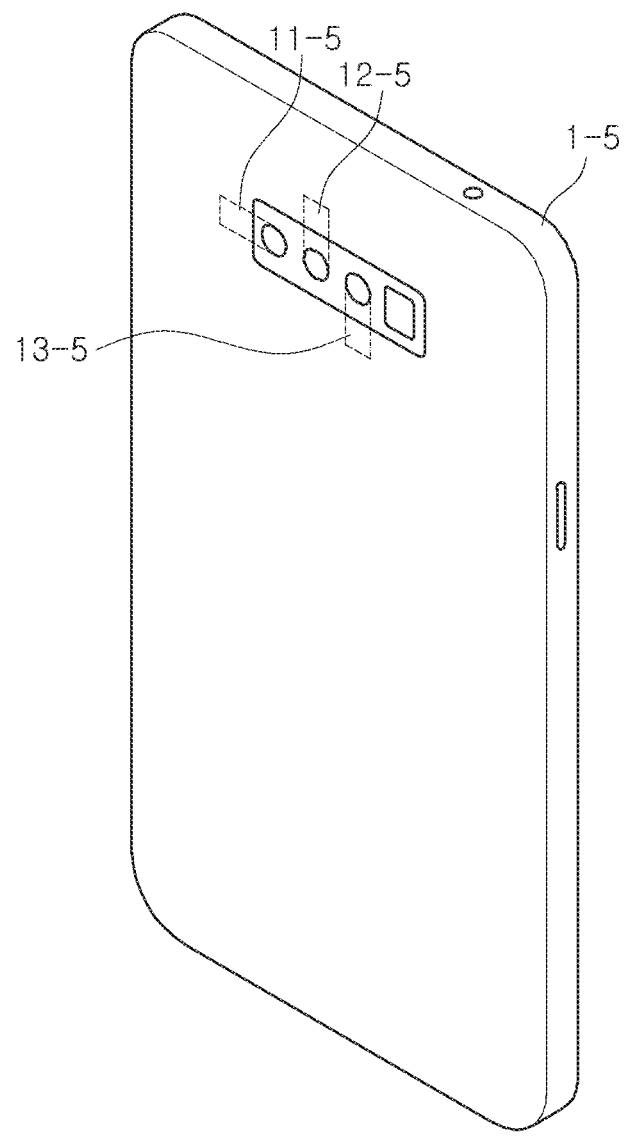

Referring to FIG. 9E, an apparatus 1-5 may include a first camera module 11-5, a second camera module 12-5, and a third camera module 13-5, sequentially arranged in the width direction of the apparatus.

As illustrated in FIG. 9E, the first camera module 11-5 may be disposed such that a length direction of the first camera module 11-5 is identical to a width direction of the apparatus. The second camera module 12-4 may be disposed such that a length direction of the second camera module 12-5 is identical to a length direction of the apparatus, but may be arranged in an upper portion of the apparatus in the length direction of the apparatus, relative to the camera lens constituting an exterior of the apparatus. The third camera module 13-5 may be disposed such that a length direction of the third camera module 13-5 is identical to a length direction of the apparatus, but may be disposed in a lower portion of the apparatus in the length direction of the apparatus, relative to the camera lens constituting an exterior of the apparatus.

FIGS. 10A to 10F are views schematically illustrating an apparatus according to some example embodiments of the present inventive concepts, and illustrate cases in which a plurality of camera modules are arranged in a length direction of the apparatus.

Figure 10A:
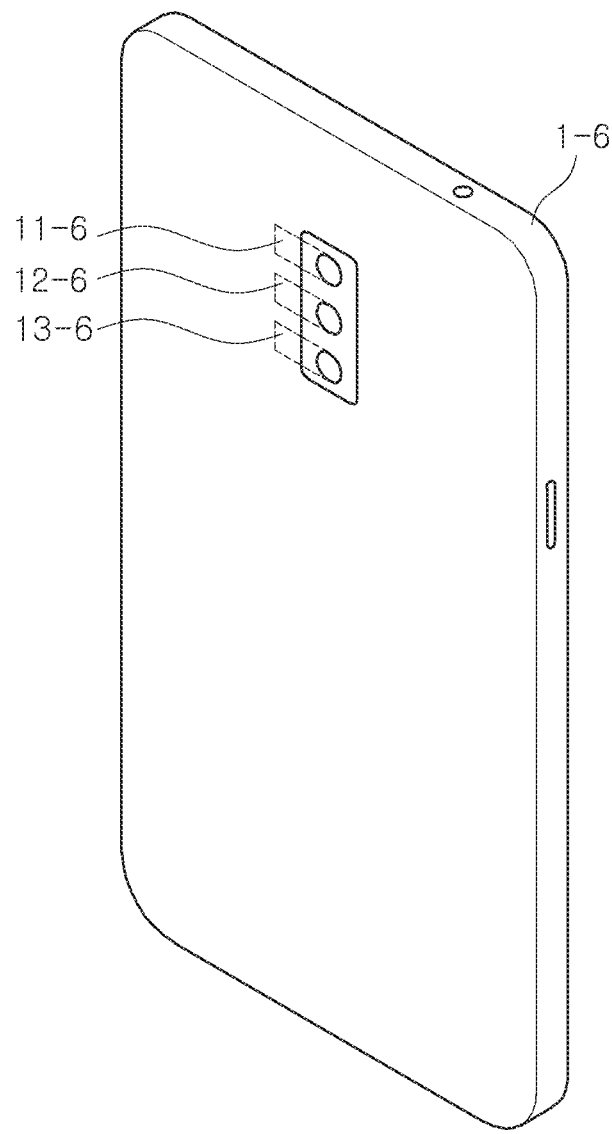

Referring to FIG. 10A, an apparatus 1-6 may include a first camera module 11-6, a second camera module 12-6, and a third camera module 13-6, sequentially arranged in a length direction of the apparatus.

As illustrated in FIG. 10A, the first camera module 11-6, the second camera module 12-6, and the third camera module 13-6 may be arranged such that a width direction of the first to third camera modules 11-6, 12-6, and 13-6 is identical to a width direction of the apparatus, but may be arranged in a left portion of the apparatus in the width direction of the apparatus, relative to the camera lens constituting an exterior of the apparatus.

Figure 10B:
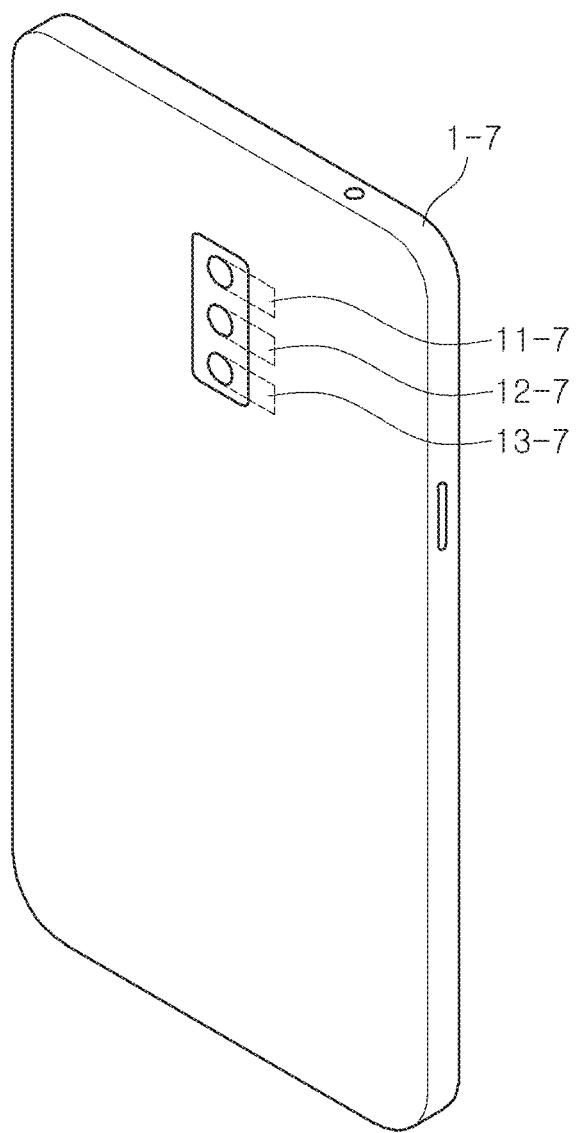

Referring to FIG. 10B, an apparatus 1-7 may include a first camera module 11-7, a second camera module 12-7, and a third camera module 13-7, sequentially arranged in the length direction of the apparatus.

As illustrated in FIG. 10B, the first camera module 11-7, the second camera module 12-7, and the third camera module 13-7 may be arranged such that a width direction of the first to third camera modules 11-7, 12-7, and 13-7 is identical to a width direction of the apparatus, but may be arranged in a right portion of the apparatus in the width direction of the apparatus, relative to the camera lens constituting an exterior of the apparatus.

Figure 10C:
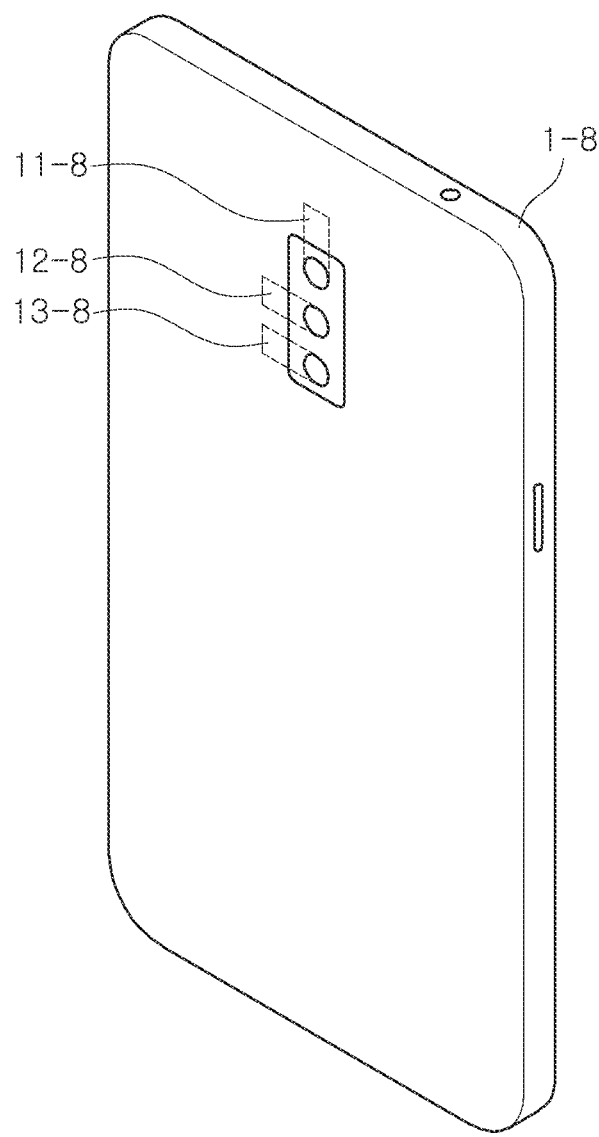

Referring to FIG. 10C, an apparatus 1-8 may include a first camera module 11-8, a second camera module 12-8, and a third camera module 13-8, sequentially arranged in the length direction of the apparatus.

As illustrated in FIG. 10C, the first camera module 11-8 may be disposed such that a length direction of the first camera module 11-8 is identical to a length direction of the apparatus. The second camera module 12-8 and the third camera module 13-8 may be arranged such that a width direction of the second and third camera modules 12-8 and 13-7 is identical to a width direction of the apparatus, but may be arranged in a left portion of the apparatus in the width direction of the apparatus, relative to the camera lens constituting an exterior of the apparatus.

Figure 10D:
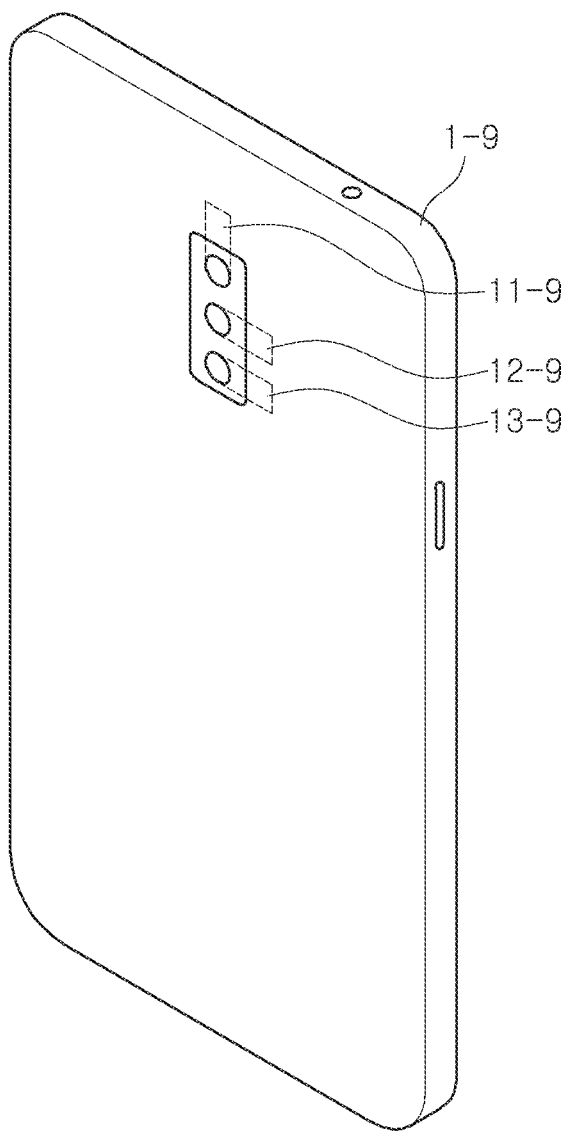

Referring to FIG. 10D, an apparatus 1-9 may be a first camera module 11-9, a second camera module 12-9, and a third camera module 13-9, sequentially arranged in the length direction of the apparatus.

As illustrated in FIG. 10D, the first camera module 11-9 may be disposed such that a length direction of the first camera module 11-9 is identical to a length direction of the apparatus. The second camera module 12-9 and the third camera module 13-9 may be arranged such that a width direction of the second and third camera modules 12-9 and 13-9 is identical to a width direction of the apparatus, but may be arranged in a right portion of the apparatus in the width direction of the apparatus, relative to the camera lens constituting an exterior of the apparatus.

Figure 10E:
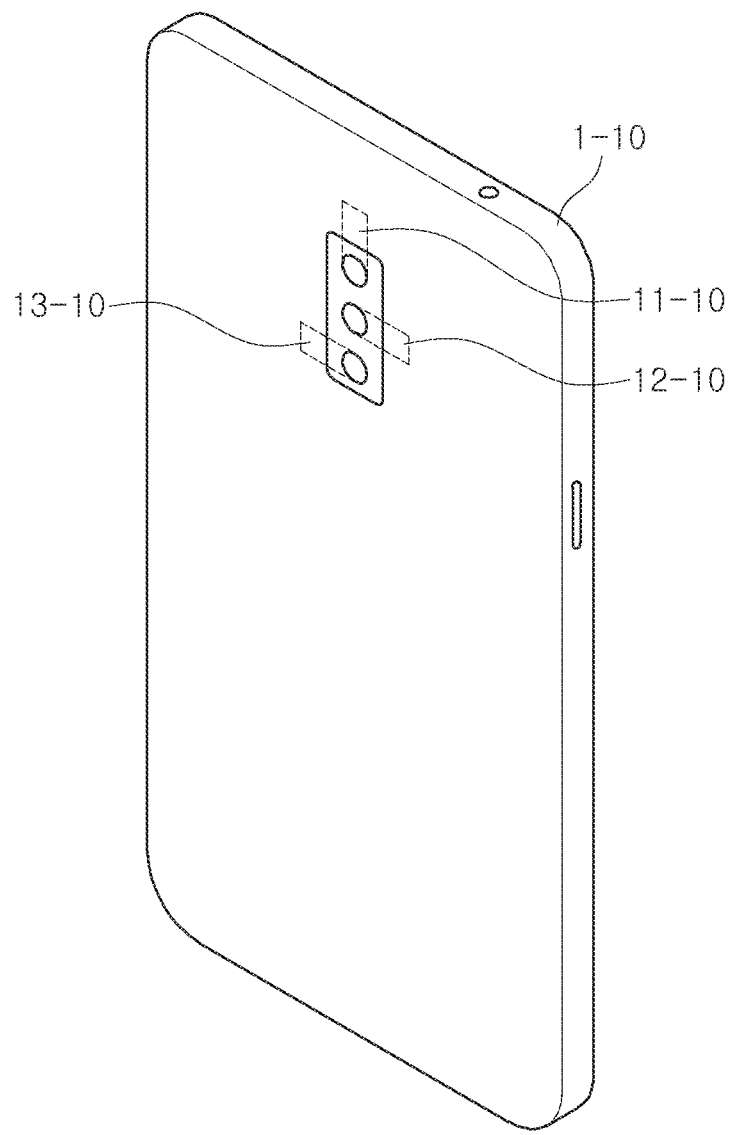

Referring to FIG. 10E, an apparatus 1-10 may include a first camera module 11-10, a second camera module 12-10, and a third camera module 13-10, sequentially arranged in the length direction of the apparatus.

As illustrated in FIG. 10E, the first camera module 11-10 may be disposed such that a length direction of the first camera module 11-10 is identical to a length direction of the apparatus. The second camera module 12-10 may be disposed such that a width direction of the second camera module 12-10 is identical to a width direction of the apparatus, but may be disposed in a right portion of the apparatus in the width direction of the apparatus, relative to the camera lens constituting an exterior of the apparatus. The third camera module 13-10 may be disposed such that a width direction of the third camera module 13-10 is identical to a width direction of the apparatus, but may be disposed in a left portion of the apparatus in the width direction of the apparatus, relative to the camera lens constituting an exterior of the apparatus.

Figure 10F:
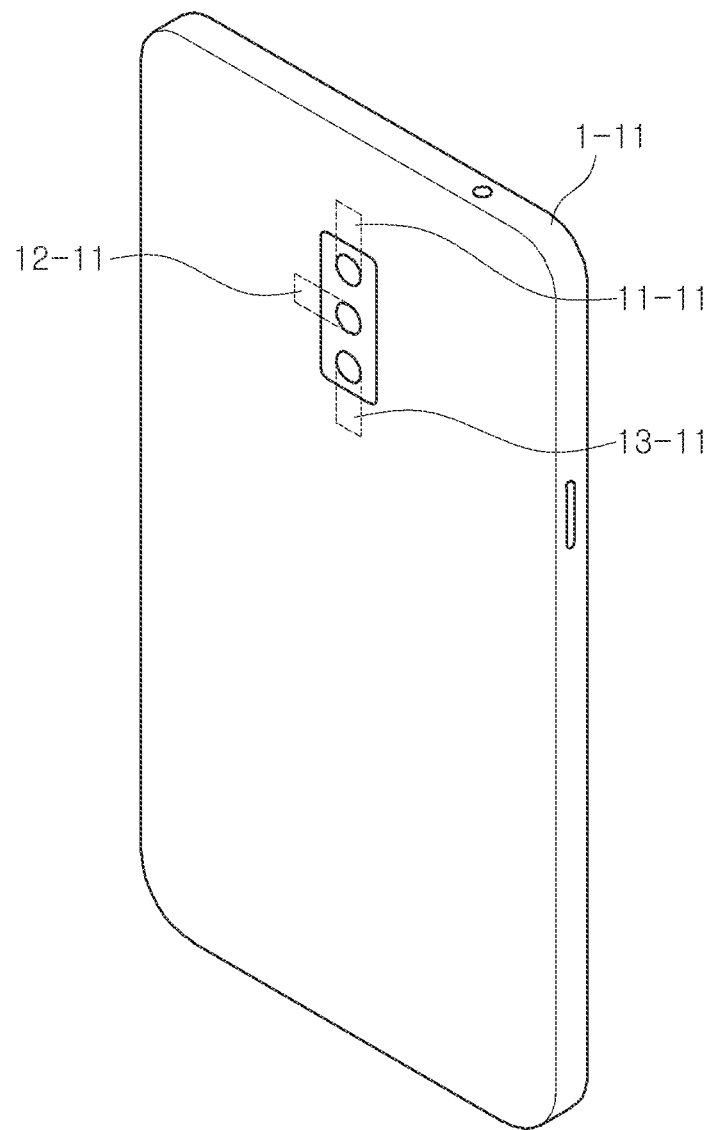

Referring to FIG. 10F, an apparatus 1-11 may include a first camera module 11-11, a second camera module 12-11, and a third camera module 13-11, sequentially arranged in the length direction of the apparatus.

As illustrated in FIG. 10F, the first camera module 11-11 may be disposed such that a length direction of the first camera module 11-11 is identical to a length direction of the apparatus. The second camera module 12-11 may be disposed such that a width direction of the second camera module 12-11 is identical to a width direction of the apparatus, but may be disposed in a left portion of the apparatus in the width direction of the apparatus, relative to the camera lens constituting an exterior of the apparatus. The third camera module 13-11 may be disposed such that a length direction of the third camera module 13-11 is identical to a length direction of the apparatus.

Figure 11A:
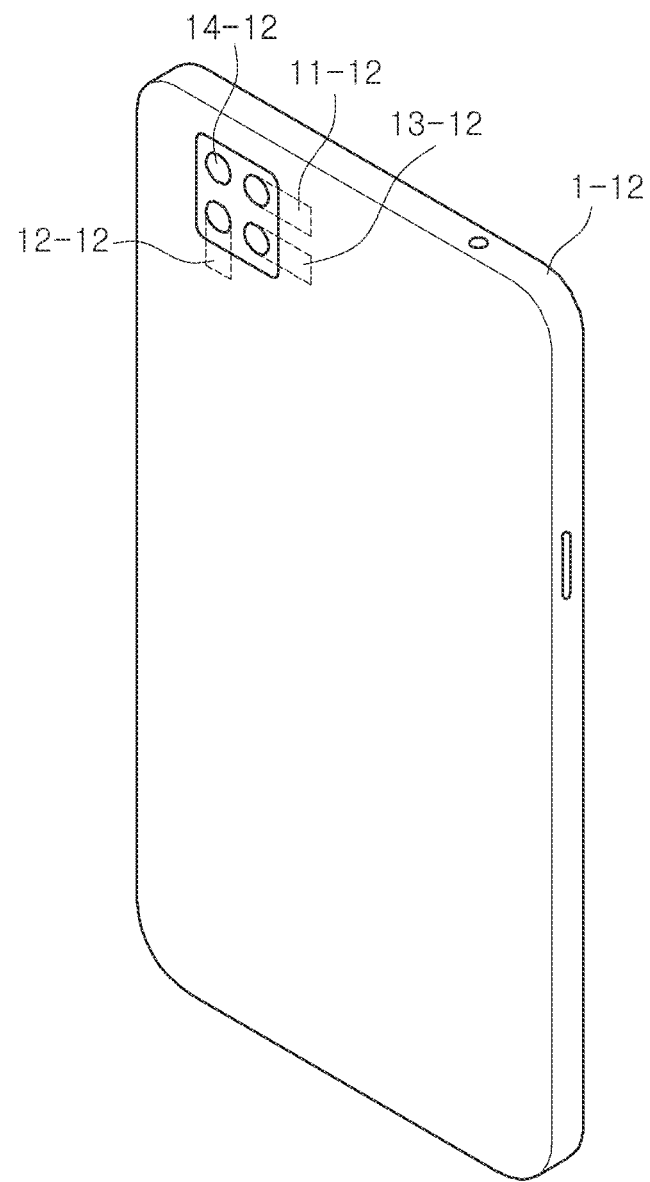
Figure 11B:
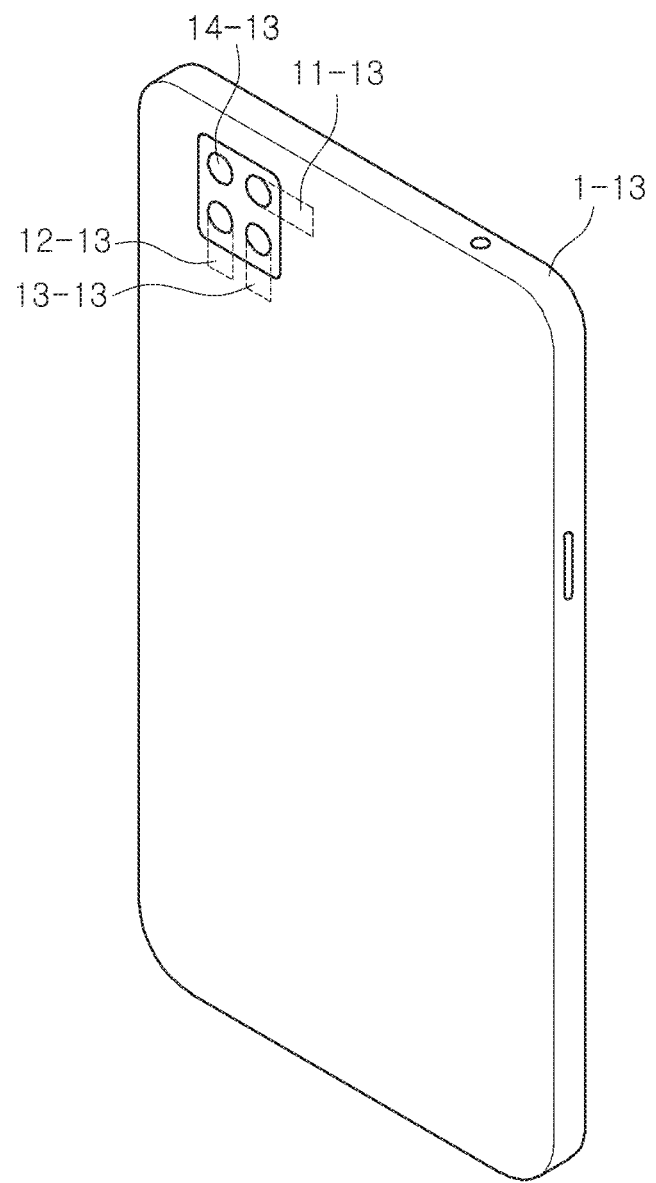

FIGS. 11A and 11B are views schematically illustrating an apparatus according to some example embodiments of the present inventive concepts, and illustrate a case in which a plurality of camera modules are arranged in an edge portion of the apparatus.

Referring to FIG. 11A, an apparatus 1-12 may include a fourth camera module 14-12 disposed adjacent to an edge of the apparatus, a first camera module 11-12 disposed on a right side of the fourth camera module 14-12, a second camera module 12-12 disposed below the fourth camera module 14-12, and a third camera module 13-12 disposed on a right side of the second camera module 12-12.

As illustrated in FIG. 11A, the first camera module 11-12 may be disposed such that a length direction of the first camera module 11-12 is identical to a width direction of the apparatus. The second camera module 12-12 may be disposed such that a length direction of the second camera module 12-12 is identical to a length direction of the apparatus. The third camera module 13-12 may be disposed such that a length direction of the third camera module 13-12 is identical to a width direction of the apparatus.

Referring to FIG. 11B, an apparatus 1-13 may include a fourth camera module 14-13 disposed adjacent to an edge of the apparatus, a first camera module 11-13 disposed on a right side of the fourth camera module 14-13, a second camera module 12-13 disposed below the fourth camera module 14-13, and a third camera module 13-13 disposed on a right side of the second camera module 12-13.

As illustrated in FIG. 11B, the first camera module 11-13 may be disposed such that a length direction of the first camera modules 11-13 is identical to a width direction of the apparatus. The second camera module 12-13 may be disposed such that a length direction of the second camera module 12-13 is identical to a length direction of the apparatus. The third camera module 13-13 may be disposed such that a length direction of the third camera module 13-13 is identical to a length direction of the apparatus.

FIGS. 9A to 11B may be a mobile terminal such as a smartphone, tablet, or the like. Although not illustrated, the present inventive concepts may be applied to various apparatuses (e.g., tablets, etc.) in which a camera module as well as a mobile terminal are mounted.

According to some example embodiments of the present inventive concepts, a high-performance camera module may be mounted in an apparatus having a relatively thin thickness.

Various and advantageous advantages and effects of the present inventive concepts may be not limited to the above description, it will be more readily understood in the process of describing the specific embodiments of the present inventive concepts.

While example embodiments have been illustrated and described above, it will be apparent to those skilled in the art that modifications and variations could be made without departing from the scope of the present inventive concepts as defined by the appended claims.

What is claimed is:

1. An optical device comprising:
    a refractive prism including a first surface facing an object, a second surface facing a first lens, and a third surface configured to reflect incident light to change a path of the incident light, one of the first surface, the second surface, or both the first and the second surface includes a pattern such that the refractive prism is a diffractive optical element; and a plurality of lenses including the first lens, the plurality of lenses configured to focus light reflected by the third surface to mimic the incident light of the object entering the first surface.

2. The optical device according to claim 1, wherein the pattern is on the first surface.

3. The optical device according to claim 2, wherein a ratio of an aperture size of the first surface to an average aperture size of the plurality of lenses is greater than 1.0.

4. The optical device according to claim 1, wherein the pattern is on the second surface.

5. The optical device according to claim 4, wherein a ratio of an aperture size of the second surface to an average aperture size of the plurality of lenses is greater than 1.0.

6. The optical device according to claim 1, wherein the pattern is on both of the first surface and second surface.

7. The optical device according to claim 6, wherein a ratio of an average aperture size of the first and second surfaces to an average aperture size of the plurality of lenses is greater than 1.0.

8. The optical device according to claim 1, wherein a ratio of an effective focal length (EFL) of the optical device to a total length (TTL) of the optical device is greater than 1.0.

9. A camera module comprising:

an optical device, the optical device including a refractive prism including a first surface facing an object, a second surface facing a first lens, and a third surface configured to reflect incident light to change a path of the incident light, one of the first surface, the second surface, or both the first and the second surface includes a pattern such that the refractive prism is a diffractive optical element, and a plurality of lenses including the first lens, the plurality of lenses configured to focus light reflected by the third surface to mimic the incident light of the object entering the first surface; and an image sensor configured to convert light incident from the optical device into an electrical signal, and output the electrical signal.

10. The camera module according to claim 9, wherein a ratio of an effective focal length (EFL) of the optical device to a total length (TTL) of the optical device is greater than 1.0.

11. The camera module according to claim 9, wherein the image sensor has an incident surface configured to receive the light, and the incident surface is parallel to the second surface.

12. The camera module according to claim 9, wherein the pattern is on the first surface, and a ratio of an aperture size of the first surface to an average aperture size of the plurality of lenses is greater than 1.0.

13. The camera module according to claim 9, wherein the pattern is on the second surface, and a ratio of an aperture size of the second surface to an average aperture size of the plurality of lenses is greater than 1.0.

14. The camera module according to claim 9, wherein the pattern is on the first and second surfaces, and a ratio of an aperture size of the first surface to an average aperture size of the plurality of lenses is greater than 1.0.

15. An apparatus comprising at least one camera module, the at least one camera module comprises:

an optical device including a refractive prism including a first surface on an object side, a second surface on a lens side, and a third surface configured to reflect incident light to change a path of the incident light, one of the first surface, the second surface, or both the first and the second surface includes a pattern such that the refractive prism is a diffractive optical element, and a plurality of lenses on the lens side of the refractive prism, the plurality of lenses configured to focus light reflected by the third surface to mimic the incident light of the object entering the first surface; and an image sensor configured to convert light incident from the optical device into an electrical signal, and output the electrical signal.

16. The apparatus according to claim 15, wherein a length direction of the camera module is identical to a length direction of the apparatus.

17. The apparatus according to claim 15, wherein a length direction of the camera module is identical to a width direction of the apparatus.

18. The apparatus according to claim 15, wherein the at least one camera module comprises a first camera module, a second camera module, and a third camera module, sequentially arranged in a width direction of the apparatus, and a length direction of the first camera module is identical to a width direction of the apparatus, and a length direction of each of the second camera module and the third camera module is identical to a length direction of the apparatus.

19. The apparatus according to claim 15, wherein the at least one camera module comprises a first camera module, a second camera module, and a third camera module, sequentially arranged in a length direction of the apparatus, and a length direction of the first camera module is identical to a length direction of the apparatus, and a length direction of each of the second camera module and the third camera module is identical to a width direction of the apparatus.

20. The apparatus according to claim 15, wherein the at least one camera module comprises a first camera module, a second camera module, and a third camera module, sequentially arranged in a length direction of the apparatus, and a length direction of each of the first camera module and the third camera module is identical to a length direction of the apparatus, and a length direction of the second camera module is identical to a width direction of the apparatus.

* * * * *